Patented Oct. 27, 1942

2,300,307

UNITED STATES PATENT OFFICE 2,300,307

PHENOLATED GUM ACCROIDES AND METHODS OF MAKING SAME

Emil E. Novotny, Oak Lane, and George Karl Vogelsang, Frankford, Pa., assignors to Durite Plastics, Incorporated, Philadelphia, Pa., a corporation of Pennsylvania No Drawing. Application Noember 5, 1938, Serial No. 239,183

6 Claims. (Cl. 260—97)

This invention relates to compositions of matter and has particular reference to the reaction products of gum accroides and phenols. The invention also concerns methods of making such compositions.

Gum accroides occurs in nature in at least two varieties or species. One species is characterized by a red-brown color and the other has a more yellowish hue. For the purposes of the present invention, both varities are equally suitable, and the term "gum accroides" will, therefore, be used to cover both species.

By the term "phenol," we intend to include all non-resinous substances having at least one reactive hydroxyl group attached directly to an aromatic ring, which will react with gum accroides under the reaction conditions to be hereinafter described. The phenol may be a monohydric phenol such as carbolic acid, the cresols, cresylic acid and the xylenols; a dihydric phenol such as catechol and resorcinol; a trihydric alcohol such as pyrogallol and phloroglucinol; or a substituted phenol containing an element or grouping such as a halogen, an amine group, a nitro group or a carboxyl group directly attached to the aromatic ring in addition to one or more reactive hydroxyl groups. As additional examples may be mentioned the corresponding phenolic derivatives of diphenyl, naphthalene, anthracene and phenanthrene. It is to be particularly noted that the term "phenol" is not intended to include resinous substances containing one or more reactive phenolic hydroxyl groups. As specific examples of such substances which are excluded from the term "phenol," we may mention the resinous condensation products of phenol and aldehydes such as formaldehyde and furfural. The term "phenol" is intended also to exclude gum accroides, which is a natural resin containing reactive phenolic hydroxyl groups.

The invention is based upon the discovery or observation that gum accroides, which as has been stated contains reactive phenolic hydroxyl groups, can nevertheless be phenolated by being reacted with a phenol under suitably controlled reaction conditions.

The phenolization of gum accroides appears to proceed in a relatively simple manner, it being merely necessary first to reflux a mixture of gum accroides and an excess of the desired phenol, and then to get rid of the unused phenol and water of reaction in a suitable manner as by slow distillation. The phenolization may advantageously be carried out in the presence of a suitable catalyst.

Either commercial or purified gum accroides may be used in the process. The commercial product generally contains from 3 to 10% of extraneous materials such as straw, woody materials, insects, etc., and we have found it to be preferable to separate these impurities as a preliminary operation to the phenolization.

The preliminary operation may be conveniently carried out by dissolving the gum accroides in a suitable solvent such as methanol or a phenol, separating the impurities by filtration or centrifuging, concentrating the solution by evaporation, preferably under vacuum, and finally removing the remainder of the solvent in a suitable form of vacuum drying equipment. The material on the filter or in the centrifuge may advantageously be washed with additional solvent, and the wash liquor may be added to the next batch of gum accroides. This procedure results in increased economy in the use of solvent and insures the extraction of all the gum accroides.

It is to be noted that the solvent need not be recovered in case a phenol is used, for the phenol solvent can also be used as the phenolating agent. The phenol has the further advantage in that it greatly reduces the fire hazard, which is an important consideration.

As has been stated, a catalyst may be employed to facilitate the process. However, a catalyst is not absolutely essential. Generally speaking, it may be stated that substances of an acidic nature or substances which are capable of liberating acidic materials are suitable for use as catalysts. As examples of suitable catalysts may be mentioned inorganic acids such as sulphurous, sulphuric, hydrochloric and phosphoric acid, and the alkyl derivatives of sulphuric acid such as diethyl sulphate as well as phenolic acids such as phenol sulphonic acid.

The reaction may advantageously be carried out in a vessel provided with suitable means for heating the contents as well as with a reflux condenser and a vapor pipe. Means may also be provided for agitating the reaction mixture. In selecting a suitable form of apparatus, it is to be noted that during the refluxing step the temperature generally rises above 200° F. and may rise as high as or above 300° F., and that during the distilaltion step the temperature may rise as high as 500° to 700° F. For all practical purposes, a temperature range of 500°–550° F. is sufficient. The removal of the surplus phenol as well as of other volatile components is greatly expedited by steam distillation, which may be carried out at atmospheric pressure or under partial vacuum. It is to be noted that the higher temperatures which obtain during the distillation step cause additional quantities of phenol to react with the gum accroides. It is also to be noted that in case sulphuric acid is used as the catalyst the phenol sulphonic acids which are formed tend to break down to form compounds of very pungent sulphurous odor. As a result the phenolated gum accroides usually has the sulphurous odor of rotten eggs. If this odor is eliminated, the phenolated product has substantially the same odor as the unphenolated material.

The following is given as an illustrative or typical example of the manner in which gum accroides may be phenolated:

Gum accroides is mixed with crude carbolic acid in the ratio of 24 parts of gum accroides to 32 parts of phenol by weight. The phenol may preferably and advantageously contain dissolved therein about 0.6 part of concentrated sulphuric acid. The mixture is refluxed for a period of from 4 to 12 hours, 8 hours being generally sufficient. As has been stated, the temperature may rise as high as or above 300° F. but it does not rise so high as to decompose the reagents or the product of the reaction. The mixture is then subjected to distillation to drive off the water of reaction and some of the surplus phenol. The distillation is continued until it substantially ceases, when the temperature of the distillate is about 390° F. and that of the residue about 500° F. As has been stated, the increased temperatures which prevail during the distillation appear to enable an additional quantity of phenol to react with the gum, thus resulting in a larger yield of phenolated gum. The weight of the residue may be used to ascertain the precise stopping point. In the case of the given proportions, it has been found advantageous to stop the distillation when the residue weighs about 30 or 31 parts. At this point about 6 or 7 parts of phenol has been tied up with the natural resin.

The resultant product upon cooling hardens to a dark brown mass having a reddish hue. It fuses at a lower temperature than the original gum accroides, and can readily be ground or ball-milled to any desired mesh or fineness. It is to be noted that the ground or pulverized product is substantially devoid of a tendency to lump or cake.

Phenolated gum accroides differs markedly from the unphenolated resin in both physical and chemical properties, and can be employed for the same general purposes but to better effect and with much better results. For instance, gum accroides has often been suggested for use as a resinous binder in the manufacture of laminated products and the fabrication of abrasive articles and as a material to increase coefficients of friction. However, products containing substantial proportions of unphenolated gum accroides have the disadvantage of being relatively weak in comparison to other resinous materials. In fact, when finely pulverized gum accroides is mixed with hexamethylenetetramine in optimum proportions, and the mixture is spread out over a hot plate at 320° F., the product while curing quite quickly soon passes into a powdery mass possessing so little adherence and strength that a strong current of air is sufficient to blow the product off the plate. Furthermore. the introduction of even as little as 5% of gum accroides in a conventional abrasive mix very markedly lowers the strength of the product. The phenolated material on the other hand yields products which are incomparably stronger and which insofar as strength is concerned resemble certain grades of the phenol resins. Then again, the phenolated material is wholly compatible with various types of phenol-formaldehyde and phenol-furfural resins of both the single and two stage type, and can be incorporated in surprisingly large quantities without detracting materially from the rolling characteristics, flow, flash cure, etc., of the mix.

Phenolated gum accroides is particularly suitable for incorporation as a modifying agent with the furan-alkyl-carbamic type of resin. Briefly stated, this type of resin can be made by interacting furfural with an alkyl-carbamic compound such as butyl urethane. The urethane may first be made by refluxing a mixture of urea, an alcohol such as butanol and an acid catalyst for from two to eight hours. The urethane is then neutralized and an excess of potassium carbonate added together with furfural. The mixture is again refluxed for several hours, the volatile materials are distilled off, and if necessary the heating is continued until there is obtained a fusible product which is hard and grindable at room temperatures.

The following is given as an illustrative method of incorporating phenolated gum accroides with a resin of the furan-alkyl-carbamic type:

The phenolated gum accroides is added to the furan-alkyl-carbamic resin just prior to its being poured from the reaction kettle. The phenolated gum accroides is allowed to fuse into the mass until a homogeneous solution results. Upon pouring and cooling the solution, a grindably hard resin results. As much as 50% or more of the phenolated gum accroides may be incorporated in the foregoing manner with good results.

Other modifying agents may also be incorporated with the furan-alkyl-carbamic type resin to produce materials of given properties for given use requirements. For example, phenols and various resinous materials may also be incorporated. As additional examples may be mentioned the various anacardic materials described in our copending applications. By the term "anacardic materials," we intend to include cashew nut shell liquid, the esterification products described in our copending application Serial No. 149,098, filed June 19, 1937 (now Patent No. 2,251,547, issued August 5, 1941), the amine derivatives described in our copending Application Serial No. 157,394, filed August 4, 1937, now Patent No. 2,253,088, issued August 19, 1941), the chlorinated materials described in our copending application Serial No. 188,786, filed February 4, 1938, and the phenol derivatives described in our copending application Serial No. 204,998, filed April 29, 1938. Hardening agents such as hexamethylenetetramine and its addition products may also be incorporated.

The phenolated gum accroides may be incorporated in situ in the furan-alkyl-carbamic resin in the following manner:

Urea (6.0 parts), butyl aldehyde (10 parts), concentrated hydrochloric acid (0.2 part), crude phenol (5 parts) and phenolated gum accroides (3 to 10 parts) are mixed and refluxed for about four hours. Then potassium carbonate (0.6 part) and furfural (9 parts) are added, and the mixture is refluxed for three more hours. The mixture is then subjected to evaporation or distillation. The contents of the kettle are permitted to attain a temperature of about 300° F. and all that will distil over initially at atmospheric pressure and subsequently under vacuum is permitted to do so, and the heating is continued, if necessary, until there results a fusible product which is grindably hard at room temperatures.

Phenolated gum accroides will react with various reagents including aldehydes such as formaldehyde, furfural, benzaldehyde, acetaldehyde, salicylaldehyde, anisaldehyde, butyl aldehyde and propionaldehyde. It will also react with the anacardic materials previously referred to. A particularly suitable reagent is phenolated cashew nut shell liquid made in the manner described in our copending application Serial No. 204,998 filed April 29, 1938.

The following is an illustrative procedure for reacting phenolated gum accroides and phenolated anacardic material:

Phenolated cashew nut shell liquid (40 parts) and phenolated gum accroides (60 parts) are mixed and slowly heated to a temperature of 550° F. for a period of about an hour or until there is obtained a grindably hard product. The amount of phenolated gum accroides may be varied anywhere between 40 to 90% without materially changing the grindably hard nature of the product.

Instead of phenolating gum accroides and anacardic material separately and then mixing them in the foregoing manner, gum accroides and anacardic material in unphenolated form may first be mixed together and then phenolated together substantially in the same manner as gum accroides itself may be phenolated. This method has the advantage that it is unnecessary to employ the high temperatures which are necessary in fusing together phenolated gum accroides and phenolated anacardic material. The chemical and physical characteristics of the resulting product depend to a large extent upon the ratio of gum accroides to anacardic material.

The products resulting from the admixture of phenolated gum accroides and phenolated anacardic material as well as the products resulting from the phenolation of a mixture of gum accroides and anacardic material are substantially on a parity with the better grades of phenol-formaldehyde resins in respect to stability, flow under heat, plasticity, rolling properties, moldability, flexibility, and mechanical and dielectric strengths. These products have the advantage over previously used resins in that they are made from very cheap, readily available materials in a very economical manner.

Phenolated gum accroides may also be reacted with phenol-aldehyde resins providing products of exceptional moldability and mechanical and dielectric strengths. For many purposes, the resulting product is preferable to either of the reactants alone. The reaction may be carried out in various ways. For instance, a phenol and an aldehyde with or without a suitable catalyst may be mixed and partially reacted, and then phenolated gum accroides may be added to the initial or intermediate product and the reaction carried to a further stage of condensation or polymerization. The aldehyde is preferably formaldehyde and the catalyst may be any of the catalysts previously used in making phenol-aldehyde resins. If a catalyst is not used, higher temperatures with or without pressure may have to be used to initiate and to carry on the reaction.

The initial or intermediate reaction product of phenol and aldehyde may advantageously be dehydrated either by steam distillation or dry distillation at atmospheric pressure or under reduced pressure before the phenolated gum accroides is incorporated. The phenolated gum accroides may be added in amounts between 5% and 40% of the phenol resin.

The following is given by way of an illustrative procedure:

Phenol (100 parts) is mixed with a 38% formaldehyde solution (75 parts) and a small quantity of an acid catalyst. After the initial reaction and after the greater portion of the water has been removed by distillation, a phenolated gum accroides (between 5% and 90% on the weight of the phenol) may be added. The dehydration reaction is then continued until a grindably hard resin is produced.

Phenolated gum accroides in finely divided form together with about 5% to 10% of a hardening agent such as hexamethylenetetramine and its various addition products may be directly incorporated with phenol resins, particularly of the phenol-formaldehyde type, to modify their chemical and physical properties. Unlike the unphenolated gum accroides, the phenolated material does not detract from the mechanical properties of the resultant product.

In conclusion, it is to be understood that the foregoing disclosure is intended to be illustrative rather than restrictive, and that no limitations are to be imported which are not required by the language of the following claims and the state of the prior art. It is to be further understood that the invention is not dependent upon any explanation or theories which have been set forth as descriptive of the reactions involved, nor dependent upon the soundness or accuracy of any theoretical statements so advanced.

We claim:

1. The method of phenolating gum accroides, which comprises the steps of refluxing a mixture consisting of gum accroides and an excess of phenol, $C_6H_5OH$, and then distilling off the excess phenol and water of reaction, the maximum residuum temperature during the distillation step being above the boiling point of the phenol and below 700° F.

2. The method of phenolating gum accroides, which comprises the steps of refluxing a mixture consisting of gum accroides and an excess of phenol, $C_6H_5OH$, in the presence on an acidic catalyst, and then distilling off the excess phenol and water of reaction, the maximum residuum temperature during the distillation step being above the boiling point of the phenol and below 700° F.

3. The method of phenolating gum accroides, which comprises the steps of refluxing for a period of from 4 to 12 hours a mixture consisting of 24 parts of gum accroides and 32 parts of phenol, $C_6H_5OH$, and then distilling off the excess of phenol and water of reaction, the maximum residuum temperature during the distillation step being above the boiling point of the phenol and below 700° F.

4. The method of phenolating gum accroides, which comprises the steps of refluxing for a period of from 4 to 12 hours a mixture consisting of 24 parts of gum accroides, 32 parts of phenol, $C_6H_5OH$, and 0.6 part of concentrated sulphuric acid, and then distilling off the excess phenol and water of reaction, the maximum residuum temperature during the distillation step being above the boiling point of the phenol and below 700° F.

5. As a composition of matter, the reaction product produced by refluxing a mixture consisting of gum accroides and an excess of phenol, $C_6H_5OH$, and then distilling off the excess phenol and water of reaction, the maximum residuum temperature during the distillation step being above the boiling point of the phenol and below 700° F.

6. As a composition of matter, the reaction product produced by refluxing for a period of from 4 to 12 hours a mixture consisting of 24 parts of gum accroides and 32 parts of phenol, $C_6H_5OH$, and then distilling off the excess of phenol and water of reaction, the maximum residuum temperature during the distillation step being above the boiling point of the phenol and below 700° F.

EMIL E. NOVOTNY.
GEORGE KARL VOGELSANG.